(12) United States Patent
Kettner-Reich

(10) Patent No.: US 7,449,659 B2
(45) Date of Patent: Nov. 11, 2008

(54) LASER PROCESSING MACHINE

(75) Inventor: Andreas Kettner-Reich, Stuttgart (DE)

(73) Assignee: Trumpf Laser- und Systemtechnik GmbH, Ditzingen (DE)

( * ) Notice: Subject to any disclaimer, the term of this patent is extended or adjusted under 35 U.S.C. 154(b) by 617 days.

(21) Appl. No.: 11/067,592

(22) Filed: Feb. 28, 2005

(65) Prior Publication Data

US 2005/0218127 A1    Oct. 6, 2005

(30) Foreign Application Priority Data

Feb. 28, 2004    (EP)    ................... 04004604

(51) Int. Cl.
*B23K 26/06* (2006.01)
*B23K 26/00* (2006.01)

(52) U.S. Cl. ............ 219/121.73; 219/121.74; 219/121.76; 219/121.77

(58) Field of Classification Search ............ 219/121.73, 219/121.74, 121.76, 121.77
See application file for complete search history.

(56) References Cited

U.S. PATENT DOCUMENTS 5,463,202 A * 10/1995 Kurosawa et al. ...... 219/121.83
5,562,842 A * 10/1996 Laferriere ............... 219/121.83
6,294,754 B1 * 9/2001 Nagura et al. .......... 219/121.63
2002/0017513 A1 * 2/2002 Nagura et al. .......... 219/121.84
2002/0134768 A1 * 9/2002 Akaba et al. ........... 219/121.63

FOREIGN PATENT DOCUMENTS

| DE | 198 38 627 | 3/2000 |
| EP | 1 020 249 | 7/2000 |
| EP | 1 199 128 | 4/2002 |
| FR | 2823688 | 10/2002 |
| JP | 2001096384 | 4/2001 |
| WO | WO 01/26859 | 4/2001 |
| WO | 2004/023430 | 3/2004 |

* cited by examiner

*Primary Examiner*—M. Alexandra Elve
(74) *Attorney, Agent, or Firm*—Fish & Richardson P.C.

(57) ABSTRACT

A laser processing machine includes a beam splitter for splitting an incoming laser beam into a first laser beam having a first intensity and a second laser beam having a second intensity, a first focusing mirror for focusing the first laser beam onto a first laser processing site on a workpiece at an angle from a direction directly above the workpiece, a second focusing mirror for focusing the second laser beam onto second laser processing site on the workpiece at an angle from a direction directly above the workpiece, and a supplementary laser processing element for supplementing laser processing of the workpiece, wherein the supplementary laser processing element is disposed directly above the first or second laser processing site.

22 Claims, 5 Drawing Sheets

LASER PROCESSING MACHINE

CLAIM OF PRIORITY

This application claims priority under 35 USC §119(a) to European Patent application number 04004604.7, filed on Feb. 28, 2004, the entire contents of which are hereby incorporated by reference.

TECHNICAL FIELD

This disclosure relates to a laser processing machine.

BACKGROUND

Sensors have been used in prior art laser processing machines to continuously follow the welding seam during laser welding. The sensor can monitor the exact position of the joint, and, in conjunction with a regulation and control unit, maintain tolerances during the welding process. It is thereby ensured that the laser welding head is always located directly above the joint. Welding seam tracing sensors and/or process control sensors are important mainly when used in connection with industrial robots, for example, for controlling the seam geometry of the weld. Process control is also important in addition to welding seam tracing. Thus, during laser processing, the degree of coupling of the laser beam, the production of splashes, and the welding depth can be monitored.

An additional way to supplement a laser welding process is by supplying a solid or gaseous additional material, for example, a process gas or a wire, during the welding.

The sensor and/or the means for supplying the additional material are generally disposed at a corresponding separation distance from the laser welding beam. The sensor is directed either at an angle toward the processing point (i.e., the sensor "faces" the processing location at an angle) or is located in a perpendicular orientation to a location in front of or behind the processing location (i.e., the sensor does not "face" processing itself, but a location that is leading or trailing relative to the processing location). However, because the laser beam typically is directed toward the workpiece from directly above the workpiece, the sensor or other supplementary laser processing element cannot also be located directly above the workpiece, because it would interfere with the laser beam or the laser beam optics. Thus, because of the orientation of the sensor (or other supplemental elements) with respect to the laser beam, in conventional arrangements, an exact rapid response by the sensor or by the additional material in three-dimensional laser processing is difficult or requires demanding technical solutions. For example, additional axes to move the sensor or the additional material can be required. The supplied data is either distorted or is not derived from the process itself. A further disadvantage is the increased size of the head, and the so-called interference contour.

SUMMARY

The invention is based, at least in part, on arranging a supplementary laser processing element directly above the surface of the processed workpiece while directing two laser beams to the processed workpiece at slight angles to the overhead direction, which permits a rapid response from the supplemental element without orientation problems in three-dimensional laser processing and also minimizes the interference contour during laser processing.

In one general aspect, a laser processing machine includes a beam splitter for splitting an incoming laser beam into a first laser beam having a first intensity and a second laser beam having a second intensity, a first focusing mirror for focusing the first laser beam onto a first laser processing site on a workpiece at an angle from a direction directly above the workpiece, a second focusing mirror for focusing the second laser beam onto a second laser processing site on the workpiece at an angle from a direction directly above the workpiece, and a supplementary laser processing element for supplementing laser processing of the workpiece, wherein the supplementary laser processing element is disposed directly above the first or second laser processing site.

Implementations can include one or more of the following features. For example, the first and second laser processing sites can be different or identical laser processing sites (i.e., they are the same site). The supplementary laser processing element can be an optical sensor adapted and arranged for monitoring laser processing of the workpiece. The supplementary laser processing element can also be an optical element adapted and arranged for directing light to a remote optical sensor that is adapted for monitoring laser processing of the workpiece. The optical element can be a mirror. The optical element can be an end of an optical fiber. In certain embodiments, the supplementary laser processing element can be a mounting element for supporting and supplying additional material to the first or second laser processing site, or to both. The supplementary laser processing element can also be a gas supply nozzle for supplying a process gas to the first or second laser processing site, or to both.

In various embodiments, the first intensity can be the same or different from the second intensity. For example, the first intensity can be more than about twice as great as the second intensity. In some embodiments, the beam splitter can be a knife-edge mirror.

The laser processing machine can further include an actuating drive adapted to pivot the supplementary laser processing element in different directions above the workpiece. The laser processing machine can further include an actuating drive adapted to displace the supplementary laser processing element above the workpiece.

The first laser processing site can be a focus of the first laser beam, the second laser processing site can be a focus of the second laser beam, and the first and second laser processing sites can be located at the same position. The supplementary laser processing element can be disposed directly above the first and second laser processing sites. In certain embodiments, the first laser beam and the second laser beam can define a cone directly above the workpiece in which the supplementary laser processing element is located.

In another general aspect, the invention features a method of processing a workpiece by providing a supplementary laser processing element directly above the workpiece and providing an input laser beam. The input laser beam is split into a first laser beam having a first intensity and a second laser beam having a second intensity. The first laser beam is focused onto a first laser processing site on a workpiece at an angle from a direction directly above the workpiece, and the second laser beam is focused onto second laser processing site on the workpiece at an angle from a direction directly above the workpiece.

Implementations can include one or more of the following features. For example, the method can further include sensing light reflected from the first and/or second laser processing site with the supplementary laser processing element and adjusting an optical property of the first or second laser beam in response to the sensed light. The first intensity can be the same or different from the second intensity. The method can further include providing a material to the first or second laser processing site from the supplementary laser processing element.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

A simple arrangement of a laser processing element that permits rapid follow-up without orientation problems and also minimizes the interference contour during three-dimensional laser processing can be achieved by splitting the laser beam into two beam portions that are focused onto the workpiece and arranging the laser processing element between the two beam portions.

Figure 1:
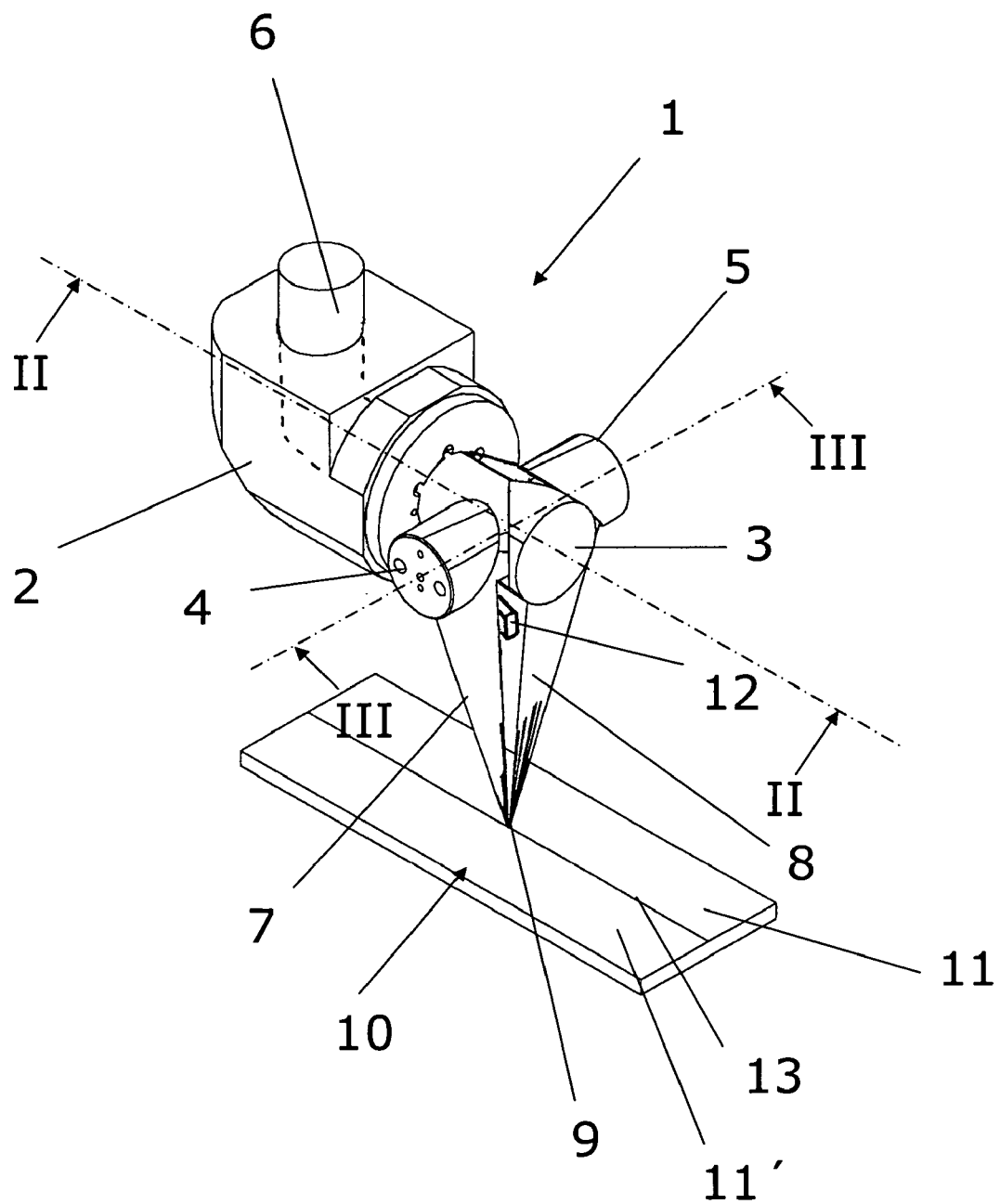
FIG. 1 is a schematic perspective view of a laser processing machine having a double focusing unit.

As shown in FIG. 1, a double focusing unit 1 of a laser processing machine includes an angle apparatus 2, a beam splitter 3 and two focusing mirrors 4 and 5. A laser beam 6 that enters the double focusing unit 1 is initially deflected and split by the beam splitter 3 into two laser beam portions 7 and 8. The beam splitter 3 can be, for example, a knife-edge mirror that can be passed into a portion of the beam to split the beam. The two laser beam portions 7 and 8 are subsequently reflected by focusing mirrors 4 and 5 and directed to a common focus 9 on a workpiece surface 10 of a workpiece 11 or 11'. A light-gathering optical sensor 12 is provided to track a welding seam 13 as the double focusing unit 1 of the laser processing head moves across the workpiece surface 10.

The two focusing mirrors 4 and 5 can be adjusted and/or pivoted in three dimensions independently of each other using piezo actuating drives. Instead of one single focus 9, two foci that are disposed closely next to or behind each other can be generated by the focusing mirrors 4 and 5. The foci may be adjusted relative to each other.

The beam splitter 3 can be fixed in the center of the impinging laser beam 6. The beam splitter 3 (e.g., a knife-edge mirror) may also be disposed to be movable and be moved out of the center of the laser beam 6, thereby permitting correction of the position of the foci or obtaining an asymmetric distribution of the power in the laser beam portions 7 and 8, such that the two laser beam portions 7 and 8 can have different intensities. For example, one laser beam portion 7 can have a minority of the overall power (e.g., about 25, 30, 35, 40, or 45%) of the laser beam 6 and serve for pre-heating the workpieces 11 and 11'. The other laser beam portion 8 can have a majority of the overall power (e.g., about 55, 60, 65, 70, or 75%) of the laser beam 6 and be used for welding the workpieces 11 and 11'.

The beam splitter 3 can be a prism disposed in the usual position of a single focusing mirror of a conventional focusing unit that does not include a beam splitter. This arrangement generates a space directly above focus 9 of the laser beam portions 7 and 8 on the workpieces 11 and 11' with good accessibility through which the laser processing of the workpieces 11 and 11' can be centrally monitored by a sensor 12 and/or through which an additional material may be centrally supplied to the laser processing site. This arrangement facilitates precise follow-up in three-dimensional processing with the sensor or other supplementary elements. For precise follow-up, the light-gathering optical sensor 12 may be immovably connected to the movable laser processing head, or the sensor 12 can be connected to the laser processing head, such that the sensor can be pivoted and displaced in the space below the beam splitting region, for example, directly above the welding joint.

A light-gathering optical element, for example, a mirror or the end of a light guide or optical fiber, can be disposed at this position instead of the sensor 12, and the optical element can guide light to a remotely located sensor. This arrangement is favorable if a sensor is used that is too large to be located in the position above the focus 9 of the laser beam portions 7 and 8.

Figure 2:
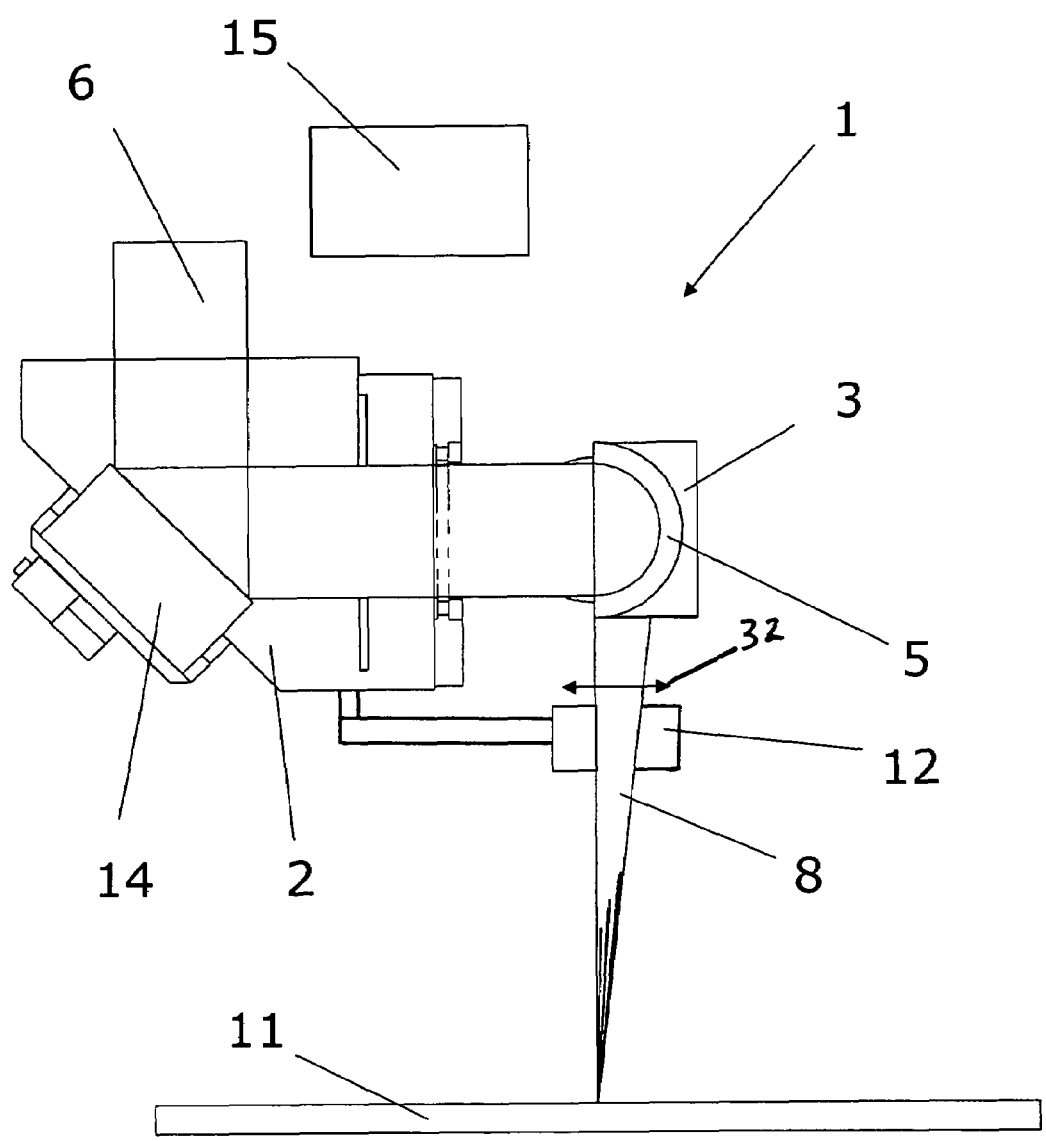
FIG. 2 is a sectional view of the laser processing machine along the line II-II of FIG. 1.
Figure 3:
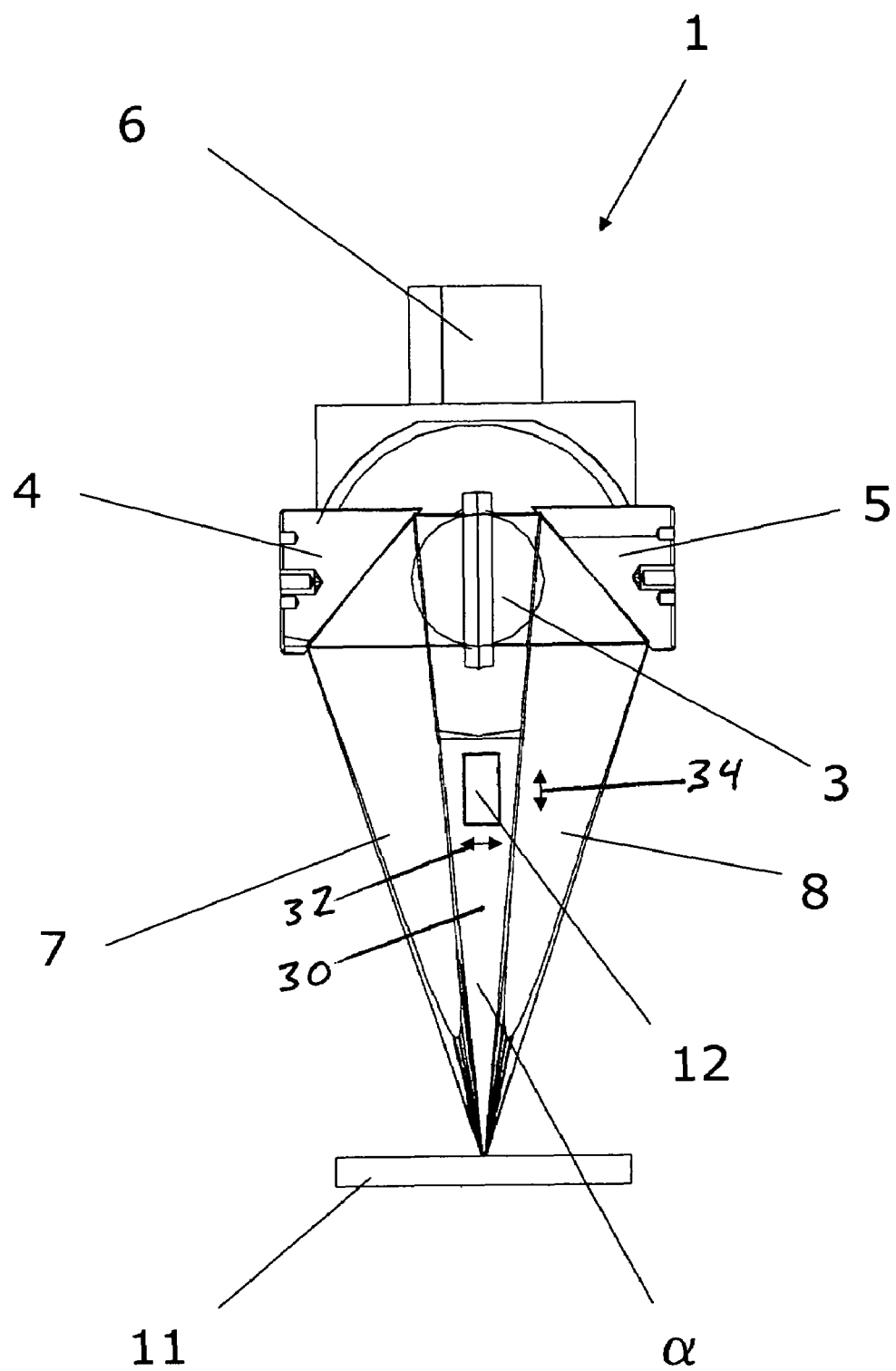
FIG. 3 is a sectional view of the laser processing machine along the line III-III of FIG. 1.

As shown in FIGS. 2 and 3, the laser beam 6 is deflected by a deflecting mirror 14 housed in the angle apparatus 2 toward the beam splitter 3. The beam splitter 3 splits the laser beam 6 into laser beam portions 7 and 8 that are directed towards focusing mirrors 4 and 5, respectively. The laser beam portion 8 is focused onto the workpieces 11 and 11' (e.g., sheet metal) using the focusing mirror 5.

The sensor 12 can monitor, for example, the degree of coupling between the laser beam portions 7 and 8, the formation of splashes from the workpieces 11 and 11', and/or the welding depth. Changes in the region of the workpiece surface 10 can be detected by the sensor 12 during laser welding. The sensor 12 is mechanically connected to the angle apparatus 2 in a manner that allows positioning of the double focusing unit 1 and additional adjustment of the sensor 12 with respect to the double focusing unit 1. The sensor 12 is electrically connected to a regulation and control unit 15, although, for clarity, the cables and connections between the sensor and the control unit 15, which are integrated in the laser processing machine, are not shown. The sensor 12 in combination with the control unit 15 can be used to control optical properties of the laser beam portions 7 and 8 (e.g., the total and relative intensities of the laser beam portions 7 and 8). For example, the control unit 15 can control the position of a knife-edge mirror beam splitter 3 in response to feedback from the sensor to vary the relative intensity of the laser beam portions 7 and 8.

Actuating drives for the two focusing mirrors 4 and 5 and for the beam splitter 3 can be provided in the focusing unit 1 and can be connected to the regulation and control unit 15, such that their positions and/or orientations can be controlled as a function of data detected by the sensor 12.

The beam splitter 3 and beam portions 7 and 8 define a space 30—a "triangle" as shown in FIG. 3—below the beam splitter 3 and starting from or above the welding joint on the workpiece 11. The sensor 12 is arranged within this "triangle." Beam portions 7 and 8 impinge onto the welding joint at an angle <90° from the side rather than directly from above the workpiece 11, and enclose together an angle α that opens from the joint. Thus, a space 30 is provided directly above the welding joint, and the sensor 12 is located in the space 30. The sensor 12 is disposed to be pivotable and displaceable (as shown by the double arrows 32 and 34 in FIGS. 2 and 3), such that the sensor 12 can be disposed between the two beam portions 7 and 8 within the angle α directly above the welding joint.

Figure 4:
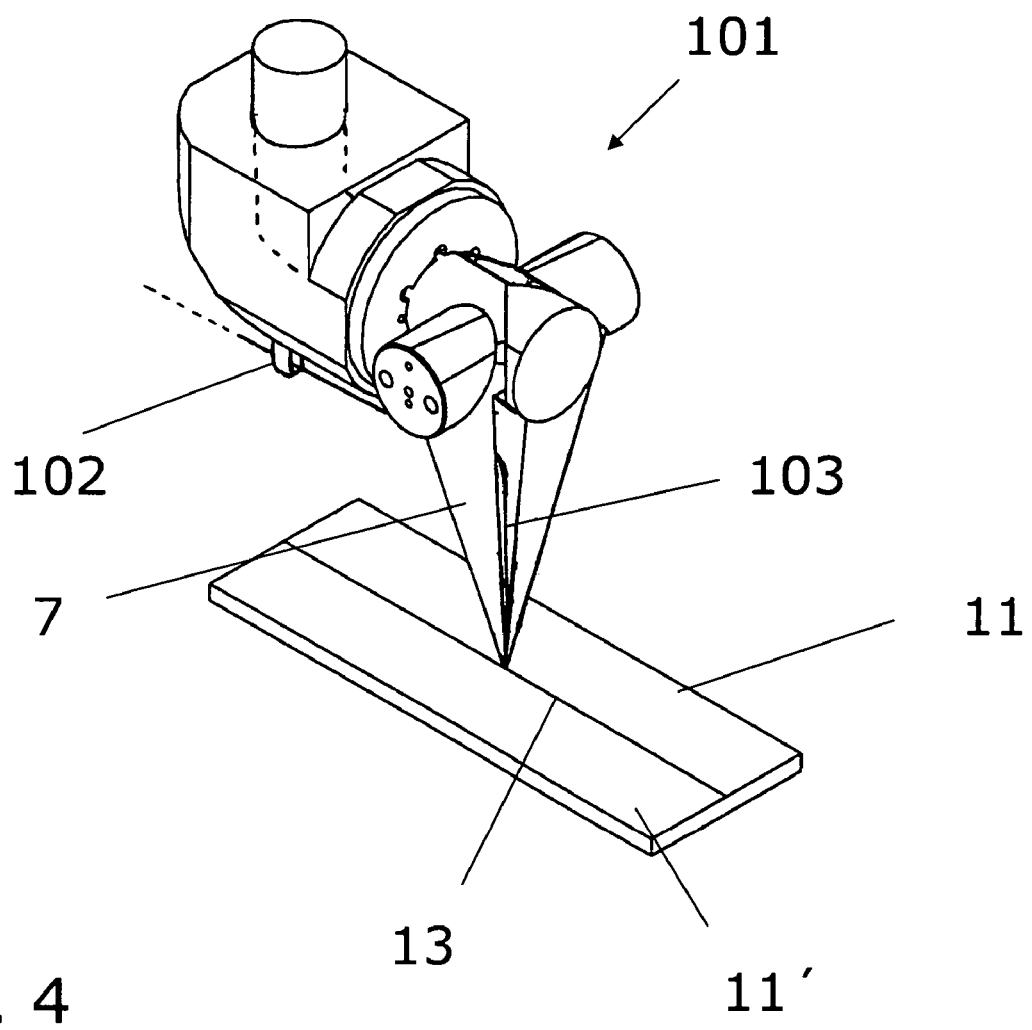
FIG. 4 is a schematic perspective view of a laser processing machine having a double focusing unit.

In other implementations, the space 30 between the two laser beam portions 7 and 8 can be used to position other materials or parts directly above the workpiece, either in place of, or in conjunction with, sensor 12. For example, as shown in FIG. 4, a mounting element 102 is provided in the region of the focusing unit 101 (which substantially corresponds to the focusing unit 1 of FIG. 1) and can be provided to support and supply an additional material (e.g., a wire or rod 103, for example, a welding rod or wire) to the welding seam 13 of the two workpieces 11 and 11' from directly above the workpieces 11 and 11' and between the two laser beam portions 7 and 8. The mounting element 102 can be, for example, a pliers, a collet, a tube, or a plurality of tubes or rings for supporting the additional material 103, and the additional material 103 can be fed through the mounting element to the welding seam 13.

Figure 5:
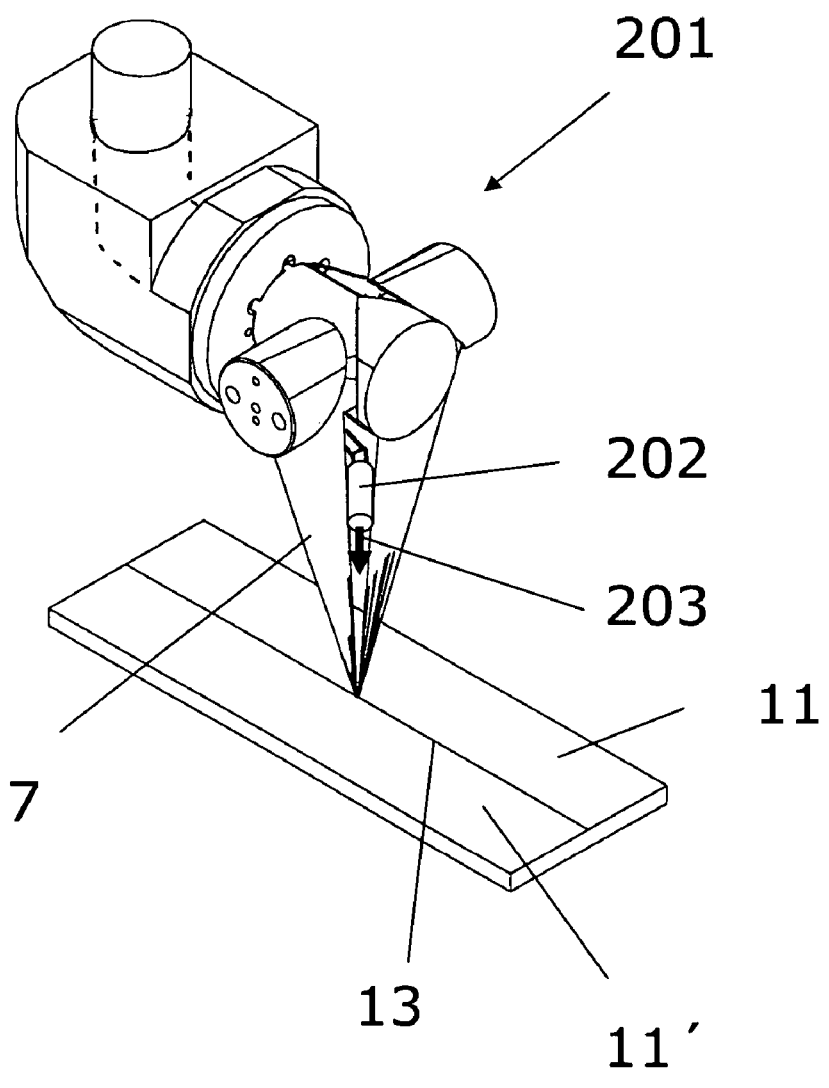
FIG. 5 is a schematic perspective view of a laser processing machine having a double focusing unit.

As shown in FIG. 5, a process gas supply 202 (e.g., a nozzle) can be disposed between the laser beam portions 7 and 8 directly above the welding seam 13 in the region of a focusing unit 201 (which substantially corresponds to the focusing unit 1 of FIG. 1). The process gas 203 can be supplied to the laser processing region from directly above the laser processing region. The process gases 203 (e.g., protective gases and/or working gases) can be supplied to the welding location in or on the laser processing head.

OTHER EMBODIMENTS

It is to be understood that while particular implementations have been described, the foregoing description is intended to illustrate and not limit the scope of the invention that can be claimed. For example, it is clear that an implementation may include the sensor 12, the supply of additional material 103 and the supply of process gases 203.

What is claimed is:

1. A laser processing machine comprising:
    a beam splitter for splitting an incoming laser beam into a first laser beam having a first intensity and a second laser beam having a second intensity;
    a first focusing mirror for focusing the first laser beam onto a first laser processing site on a workpiece at an angle from a direction directly above the workpiece;
    a second focusing mirror for focusing the second laser beam onto second laser processing site on the workpiece at an angle from a direction directly above the workpiece;
    one or more actuating drives to which one or more of the beam splitter, the first focusing mirror, and the second focusing mirror are mounted; and
    a movable optical sensor adapted and arranged for monitoring laser processing of the workpiece, wherein the movable optical sensor is disposed above the first or second laser processing site and between the first and second laser beams.

2. The laser processing machine of claim 1, wherein the first and second laser processing sites are identical laser processing sites.

3. A laser processing machine comprising:
    a beam splitter for splitting an incoming laser beam into a first laser beam having a first intensity and a second laser beam having a second intensity;
    a first focusing mirror for focusing the first laser beam onto a first laser processing site on a workpiece at an angle from a direction directly above the workpiece;
    a second focusing mirror for focusing the second laser beam onto second laser processing site on the workpiece at an angle from a direction directly above the workpiece;
    one or more actuating drives to which one or more of the beam splitter, the first focusing mirror, and the second focusing mirror are mounted; and
    a movable optical element adapted and arranged for directing light to a remote optical sensor that is adapted for monitoring laser processing of the workpiece, wherein the optical element is disposed above the first or second laser processing site and between the first and second laser beams.

4. The laser processing machine of claim 3, wherein the optical element is a mirror.

5. The laser processing machine of claim 3, wherein the optical element is an end of an optical fiber.

6. The laser processing machine of claim 1, wherein the first intensity is different from the second intensity.

7. The laser processing machine of claim 5, wherein the first intensity is more than about twice as great as the second intensity.

8. The laser processing machine of claim 1, wherein the beam splitter is a knife-edge mirror.

9. The laser processing machine of claim 1, further comprising an actuating drive adapted to pivot the movable optical sensor in different directions above the workpiece.

10. The laser processing machine of claim 1, further comprising an actuating drive adapted to displace the movable optical sensor above the workpiece.

11. The laser processing machine of claim 1, wherein the first laser processing site is a focus of the first laser beam, wherein the second laser processing site is a focus of the second laser beam, and wherein the first and second laser processing sites are located at the same position.

12. The laser processing machine of claim 11, wherein the movable optical sensor is disposed directly above the first and second laser processing sites.

13. The laser processing machine of claim 1, wherein the first laser beam and the second laser beam define a cone directly above the workpiece in which the movable optical sensor is located.

14. A method of processing a workpiece, the method comprising:
    providing an input laser beam;
    splitting the input laser beam into a first laser beam having a first intensity and a second laser beam having a second laser beam having a second intensity;
    focusing the first laser beam to a first focus onto a first laser processing site on a workpiece at an angle from a direction directly above the workpiece;
    focusing the second laser beam to a second focus onto a second laser processing site on the workpiece at an angle from a direction directly above the workpiece;

adjusting the foci relative to each other; and providing a movable optical sensor above the workpiece and between the first and second laser beams to monitor laser processing of the workpiece.

15. The method of claim 14, further comprising:

sensing light reflected from the first or second laser processing site with the movable optical sensor; and adjusting an optical property of the first or second laser beam in response to the sensed light.

16. The method of claim 14, wherein the first intensity is different from the second intensity.

17. The laser processing machine of claim 3, wherein the first and second laser processing sites are identical laser processing sites.

18. The laser processing machine of claim 3, wherein the first intensity is different from the second intensity.

19. The laser processing machine of claim 3, wherein the beam splitter is a knife-edge mirror.

20. The laser processing machine of claim 3, further comprising an actuating drive adapted to pivot the optical element in different directions above the workpiece.

21. The laser processing machine of claim 3, further comprising an actuating drive adapted to displace the optical element above the workpiece.

22. The laser processing machine of claim 3, wherein the first laser processing site is a focus of the first laser beam, wherein the second laser processing site is a focus of the second laser beam, and wherein the first and second laser processing sites are located at the same position.

* * * * *